United States Patent [19]
Alford et al.

[11] Patent Number: 5,531,895
[45] Date of Patent: Jul. 2, 1996

[54] METHOD AND APPARATUS FOR INSTALLING AND REMOVING BIOLOGICALLY STRUCTURED WALL SYSTEMS

[76] Inventors: George Alford, 1954 Old Daytona Rd., Daytona Beach, Fla., 32014; D. Roy Cullimore, 3303 Grant Road, Regina, Saskatchewan, Canada, S4S 5H4; Al T. Mikell, 2226 Lee Loop, Oxford, Miss., 38655

[21] Appl. No.: 374,238

[22] Filed: Jan. 18, 1995

[51] Int. Cl.⁶ .................................................. B09C 1/10
[52] U.S. Cl. ..................... 210/610; 210/747; 210/901; 435/262; 166/310; 405/128
[58] Field of Search ............................. 210/610, 611, 210/620, 747, 901; 435/262, 264; 166/241, 310; 403/128

[56] References Cited

U.S. PATENT DOCUMENTS

| | | | |
|---|---|---|---|
| 3,846,290 | 11/1974 | Raymond | 210/610 |
| 4,401,569 | 8/1983 | Jhaveri et al. | 210/747 |
| 4,755,304 | 7/1988 | Hallberg et al. | 210/611 |
| 4,992,174 | 2/1991 | Caplan et al. | 210/747 |
| 5,006,250 | 4/1991 | Roberts et al. | 210/610 |
| 5,277,815 | 1/1994 | Beeman | 210/747 |
| 5,384,048 | 1/1995 | Hazen et al. | 210/610 |

*Primary Examiner*—Christopher Upton
*Attorney, Agent, or Firm*—James B. Middleton

[57] ABSTRACT

The environment in a porous area, such as in an aquifer in controlled to promote the growth of indigenous microorganisms as well as introduced microorganisms. Nutrients and other growth-promoting chemicals are added to cause the organisms to grow and produce a biofilm that retards fluid movement. Tubes are inserted into the target area, and fluids containing nutrients and other chemical are circulated through the porous area, the paths of circulation defining the areas of growth of microorganisms to produce a barrier, referred to as a biowall. After the biowall has served its purpose, it can be dispersed by injecting chemicals to stop growth and/or to kill the microorganisms.

11 Claims, 3 Drawing Sheets

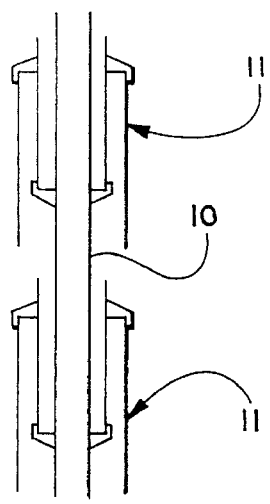
Fig_1
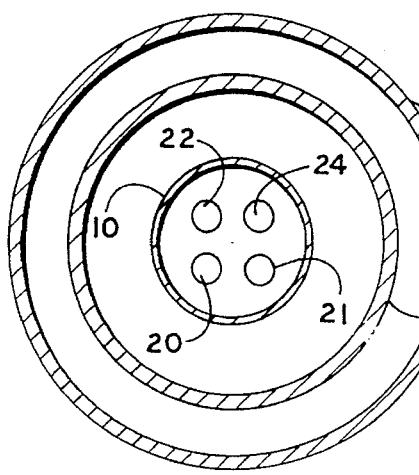
Fig_3
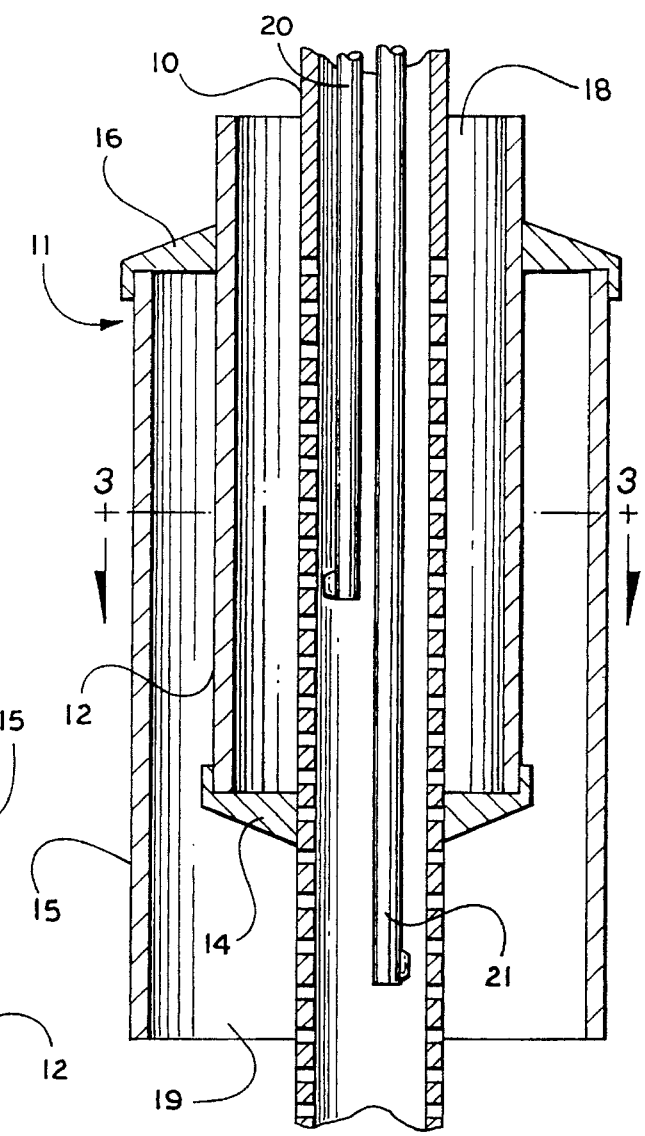
Fig_2
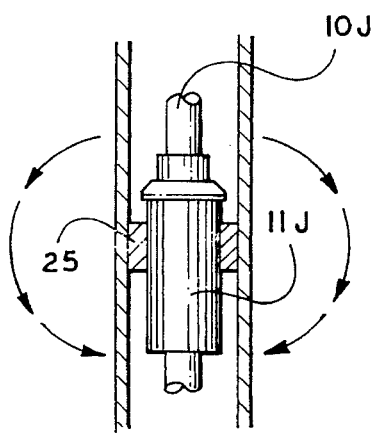
Fig_8

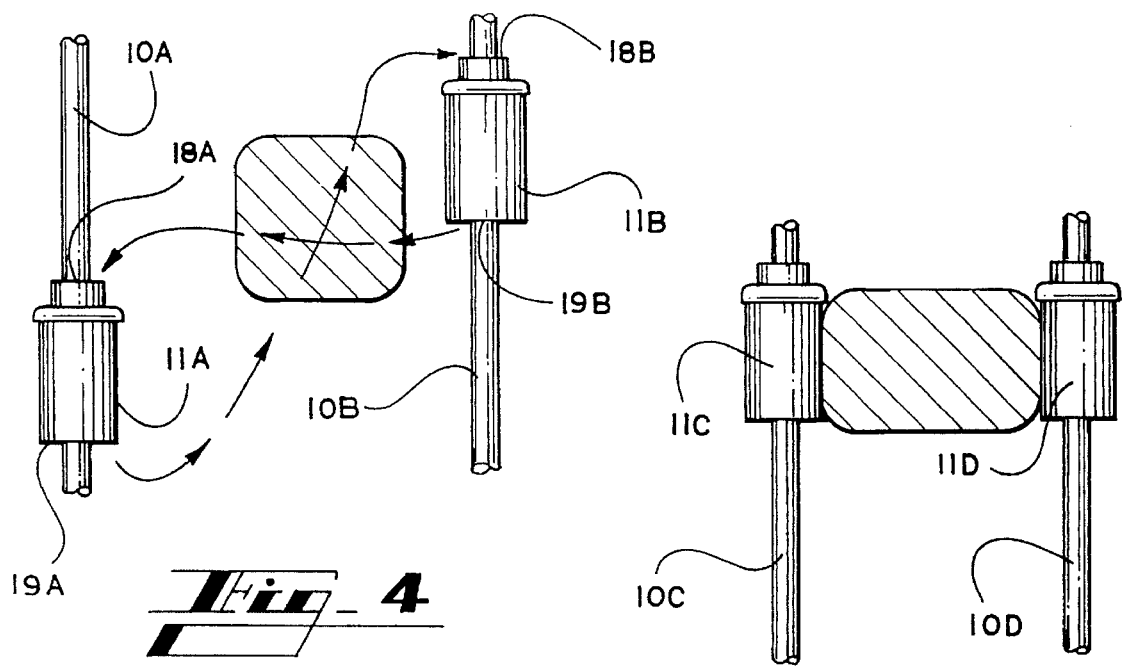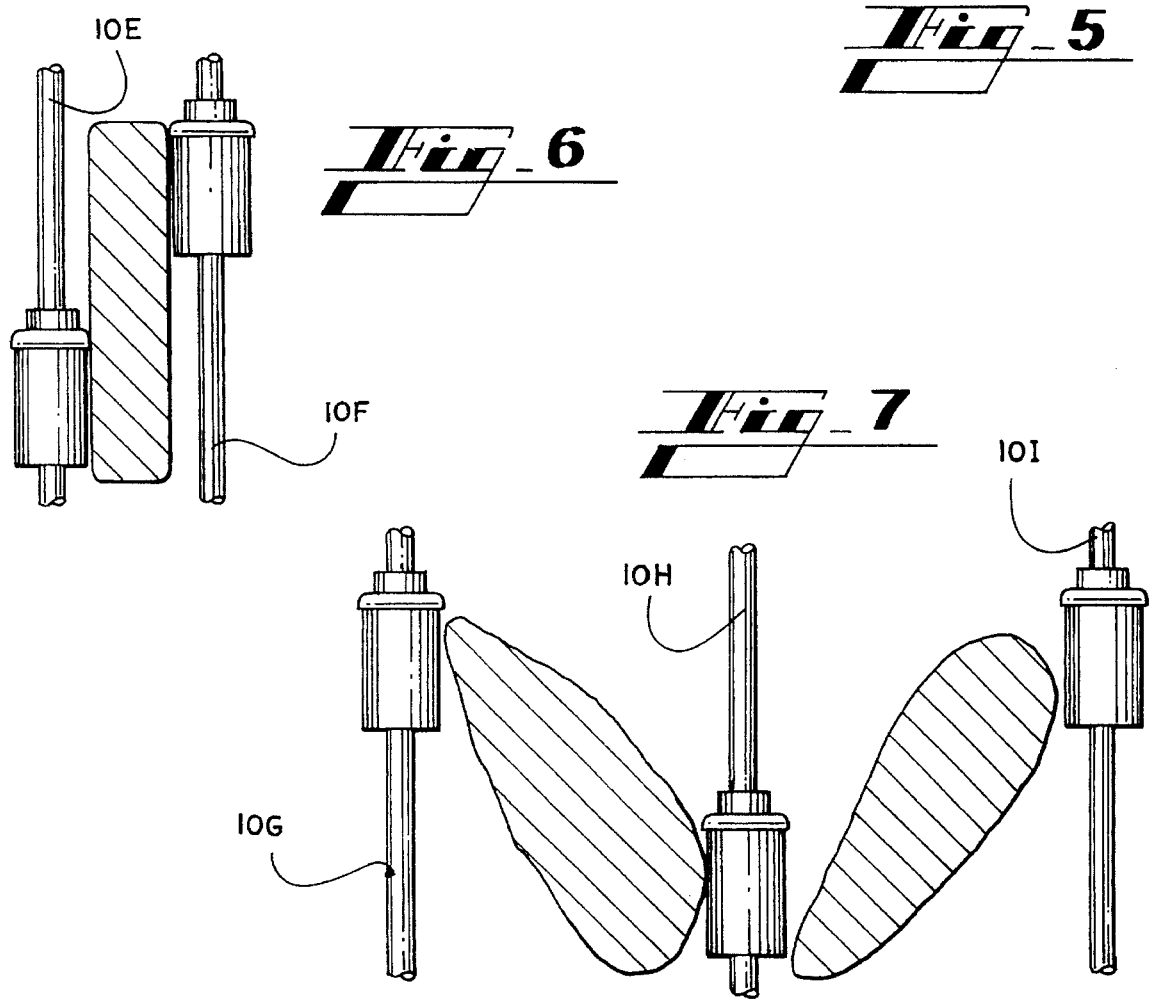

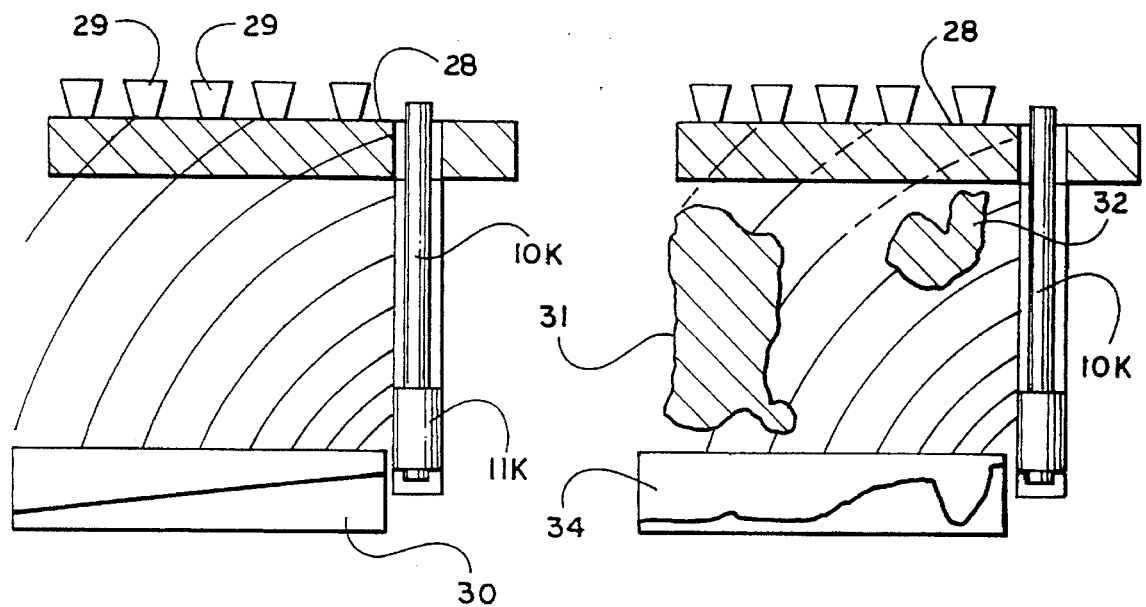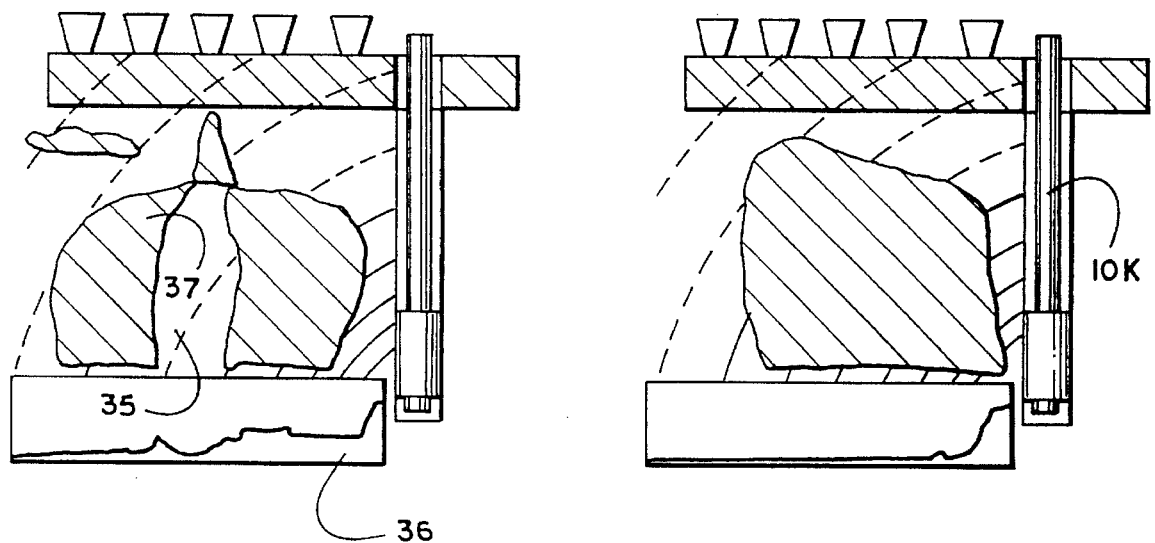

METHOD AND APPARATUS FOR INSTALLING AND REMOVING BIOLOGICALLY STRUCTURED WALL SYSTEMS

BACKGROUND OF THE INVENTION

1. Field of the Invention

This invention relates generally to the utilization of biological mass for obstructing passages, and is more particularly concerned with a method and apparatus for forming an obstruction and for removing such obstruction when desired.

2. Discussion of the Prior Art

It has been found that microorganisms play a role in the generation of clogs within an aquifer. In general, such a clog formation may comprise microbial communities situated within a slime formation wherein there are also accumulations of metallic salts, carbonates, and recalcitrant organics. Such growths reduce the hydraulic conductivity of the porous medium forming the aquifer and impedes the movement of water therethrough.

As the slime formation matures, a range of functions may occur to variable extents, which include biodegradation of amenable organic compounds and accumulation of inorganic and recalcitrant organics. Some of the bioaccumulates may otherwise pose a risk to the users at downstream sites. Erratic changes in the physical and chemical properties may also occur in waters passing though such an infested zone. Eventually there may be an occlusion of the void spaces, causing severe restrictions to hydraulic conductivity, or complete loss in flow.

SUMMARY OF THE INVENTION

The present invention provides for the deliberate construction of a microbiologically formed clog at a predetermined site, the clog being managed in a predictable manner to achieve specific objectives. The invention therefore provides a barrier that can, for example, contain a plume of hazardous materials in ground water, or allow site specific biodegradation of an organic pollutant. The general term to be used for the entity resulting from the deliberate formation of a microbiologically formed clog is "biowall".

The inventors believe, and have shown by experiment, that a manipulation of the environmental conditions at a specific site can cause shifts in the microbial community, and adaptation to the conditions created by such manipulation. In consequence, the present invention includes the application of the techniques using the natural microorganisms present at the proposed site, as well as strains of microorganisms that have been manipulated naturally, artificially or genetically. The combination of microorganisms will be selected to achieve a specified function at the intended site, including biowall synthesis, maintenance or disposal.

BRIEF DESCRIPTION OF THE DRAWINGS

These and other features and advantages of the present invention will become apparent from consideration of the following specification when taken in conjunction with the accompanying drawings in which:

FIG. 1 is a schematic representation of an insertion system for use in the present invention;

FIG. 2 shows a portion of the system of FIG. 1, somewhat enlarged;

FIG. 3 is a cross-sectional view taken along the line 3—3 in FIG. 2;

FIGS. 4–7 are schematic illustrations showing how the area of construction of a biowall is controlled;

FIG. 8 is a schematic illustration showing monitoring of the hydraulic conductivity; and, FIGS. 9–11 are schematic illustrations showing techniques for determining the permeability of a porous medium surrounding an injection system.

DETAILED DESCRIPTION OF THE EMBODIMENTS

The insertion of a biowall into the porous medium within a site-specific zone of an aquifer holds a number of important management strategy potentials regarding both qualitative and quantitative factors for ground waters entering, leaving, and passing through the site of influence. All of the microorganisms necessary for the establishment, maturation and functioning of the biowall are intrinsic to the habitat, or are normally introduced by the various operations commonly associated with the entry into a saturated aquifer. The Beijerinkian premise that "everything is everywhere, the environment selects" forms a cornerstone to the present invention.

Where artificial manipulation is to be achieved, the site of the manipulations may be at a separate location that is suitably positioned with respect to the site for construction of the biowall. For example, a chemostat for the growth of a suitably adapted microbial feedstock can be placed at a surface site directly above the proposed site of the biowall. Thus, microorganisms involved in the synthesis of the biowall are pre-adapted, by environmental adaptations, and subsequently generated into a form (e.g. ultramicrobacteria, plasmid components) suitable for insertion into an appropriate point for incorporation in the biowall being formed. The relationship of the degree of microbial activity generated in the chemostat to the amount of activity occurring within and around the biowall will be dependent on the objective of the biowall.

Biowalls in accordance with the present invention can be created with porous media in preplanned formations. The biowall may be formed into a flat structure in any lateral or vertical plane, or in a curved plane to suit the site-specific need for the biowall. The positioning of the biowall is based on the imposition of environmental conditions at specific sites to cause a focusing of microbiological activity within the environmentally optimized zones. Optimal conditions will be created by the application of materials and monitoring systems using tubes, probes and such devices discussed below. Those skilled in the art will understand that the conditions to be manipulated include nutrients, deliberate adjustment of the redox potential, changes in the electromagnetic field potentials at various intensities, introduction of suitable electron donors or acceptors. Each of these conditions, in some measure, creates the conditions desired for formation, maintenance, and subsequent dispersal of the biowall.

The method of the present invention includes the steps of: (1) measurement of the hydraulic conductivity of the formation to determine the effectiveness of the application of the present invention; (2) administration of sequential application of various nutrients, chemicals in solid, liquid or gaseous form to stimulate the formation of an active biomass that will form into, maintain or disperse the biowall; (3) application of a series of electromagnetic or sonic impulses to create hydrolytic or electrolytic effects supportive to the formation, maintenance or dispersion of the biowall; and (4) remove products generated by the presence of the biowall which may be of environmental or economic significance.

A consortium (community) of microorganisms needs to be administered to the chosen site of occlusion to ensure the successful generation of the biowall structure. Such a consortium has been generated using equivalent cell populations of *Pseudomonas fluorescens, Ps. vesicularis, Agrobacterium radiobacter, Erwinia carotovora, Acinetobacter calcoaceticus, Desulfovibrio desulfuricans, Desulfuromonas acetoxidans, Bacillus cereus* and *Bacillus thuringiensis* with a combined population of $10^4$ colony forming units/ml at the site.

The organisms forming the implanted community will react, on inoculation, with the intrinsic microflora and such extrinsic organisms as may have been covertly introduced to the site at the time of installation. In consequence of such interactions, the product (blended) consortium generated through the installation process will be a mixture of the implanted community and the other microorganisms present at the site for other natural and accidental reasons. In accordance with the present invention an on-site environment will be generated which will encourage the activities of the implanted consortium to achieve occlusion within the targeted porous medium and achieve a biologically constructed hydraulic barrier to water flow. The synthesis of the biowall using a blended mixture of inoculated, intrinsic and extrinsic microbes will be achieved in two states by the manipulation of such critical factors as the redox potential, nutrient levels, the carbon:nitrogen:phosphorus (C:N:P) ratio and the generation of physical and chemical gradients. The first stage of the occlusion will be achieved by microbial generated gas (M.G.G.) through the stimulation of microorganism able to generate methane, carbon dioxide, hydrogen or nitrogen gases in various combinations. In the event of the saturation of the void water with the specific gases, the surplus will generate as gas bubbles which will gradually fill the voids and be entrapped by biofilms formed by the product consortium at the gas:water interface. Such gas-occluded voids will have reduced conductivity and effectively create the first stage barrier. This barrier will gradually collapse as the gases are reassimilated into the encompassing biofilms or dissolved into the water. The second stage barrier will be generated by the occupation of the void spaces with thickening and interlocking consortial biofilms. Occlusion may be expected to occur at any time between when a 40 and 80 percent consortial occupancy of the void spaces has occurred. The precise void occupancy will depend on the porosity structural dimensions and degree of biolocked water which have occurred within the targeted porous medium.

The length of time within which the biowall can be maintained is dependent on the at-site conditions. Where a prolonged biowall is to be placed, the location of the biowall can be shifted by relocating the site of nutrient injection in the system and shifting the redox front to relocate much of the incumbent viable biomass. Such manipulations will, when performed in a deliberate and engineered manner, cause the focus of microbiological activity and colonization to refocus appropriately.

Once the function of the biowall has been achieved, the natural processes intrinsic to the site will dominate. This will cause many of the extrinsic and inoculated microbial strains either to shift to a more favorable environment (where porosity is adequate) or enter a survival mode. Such survival modes may remain static and may involve passive movement with the water flow. These survival forms may include suspended animates (such as ultramicrobacteria, endospores and exospores) or vegetative forms functioning at a minimal metabolic level. The net effect of the return of the site to traditional (natural) constraints is to disperse gradually the biomass which has been congregated at and around the site of the biowall. In the event that the biomass has to be removed (due to some specific environmental concern) from the site in order to reduce the dispersion impact and remove any bioaccumulated material from the site of construction of the biowall, the process disclosed in U.S. Pat. No. 4,765,410 when applied at-site together with an acceptable form of sonication can penetrate most porous media and allow the shock, disruption and removal of assemblage of biomass which constitutes the biowall.

The present invention includes the unique devices utilized to gain entry to the targeted site, and the management structure to allow creation, maintenance and dispersal of a biowall having predictable dimensions, and conformity to the targeted site. The basic concept of the present invention includes the deliberate stimulation of the microflora at a given site.

Referring now more particularly to the drawings, and to that device presented in FIGS. 1–3, there is an insertion tube 10 that will extend from the surface of the earth down to the location under consideration. It will be understood by those skilled in the art that a large well-casing or other such structure will be in place to allow positioning of the insertion tube 10 and related apparatus. The insertion tube 10 has at least one portal structure 11 movable along its length, and may have a plurality of portal structures 11 as shown in FIG. 1.

The portal structure 11 is shown in more detail in FIG. 2 where it can be seen that the portal structure 11 comprises an inner tube 12 having a cap 14 for sealing the tube 12 with respect to the insertion tube 10, and an outer tube 15 having a cap 16 sealing the tube 15 with respect to the inner tube 12. Thus, the portal structure 11 defines an upwardly opening port 18 and a downwardly opening port 19.

Within the insertion tube 10 there is a plurality of conduits for delivering the desired liquid or gas. Such conduits will also carry sensors for monitoring conditions. As shown in FIG. 2, the conduit 20 is positioned for delivering a fluid to the inner tube 12. It will be understood that the insertion tube 10 is porous to allow flow of fluid therethrough, while the inner tube 12 is non-porous. Thus, fluid from the conduit 20 will be expelled through the portal 18. Similarly, there is a conduit 21 positioned for delivering a fluid to the outer tube 15 to be expelled through the portal 19. Additional conduits such as the conduit 22, can be provided as desired if additional materials are to be delivered to the site.

Sensors to monitor such factors as rate of flow and temperature are included in a separate conduit 24. Fluids may be expelled from the lower portal 19 of the portal structure; and, the fluids may move through facilitated flow patterns until entrapped in the flow to the upper portal 18. The flow may be to the same portal device, or may be to the upper portal on a different insertion tube. This will be discussed in more detail later.

By juxtaposing a plurality of insertion tubes 10, a flow pattern can be established between insertion tubes, thereby determining the formation of a biowall. In the example shown in FIG. 4 of the drawings, the left hand tube 10A has a portal structure 11A located low on the insertion tube 10A, while the right hand insertion tube 10B has a portal structure 11B located high on the insertion tube 10B. Fluid—either liquid or gas—can be caused to flow from the lower portal 19A of the insertion tube 10A in a direction created by the pumping activity to the upper portal 18B of the insertion tube 10B. As the material flows from the lower portal 19A to the upper portal 18B, there will also be a flow from the lower portal 19B on the insertion tube 18B to the upper portal 18A on the insertion tube 10A. The fluid flow determines the area of influence of the treatment, and thereby determines the shape and location of a biowall.

FIGS. 5–7 of the drawings further illustrate the fact that the disposition of the portal structures 11 will determine the formation of the biowall. In FIG. 5, the portal structures 11C and 11D are set high on the insertion tubes 10C and 10D with lateral flows between the portals of the two structures. This flow causes the generation of a lateral biowall extending between the insertion tubes 10C and 10D at the level of the portal structures 11C and 11D. Introduction of additional, similarly conformed tubes, will allow the lateral biowall to be extended to form a horizontal plate.

FIG. 6 shows two insertion tubes 10E and 10F placed in close proximity, with one portal structure low on the insertion tube and the other portal structure high on the insertion tube. With this arrangement, a vertical biowall will be generated. A dense arrangement of this type of structure could lead to the synthesis of a vertically disposed biowall of sufficient density to cause the permeability through a given zone to be reduced by several orders of magnitude.

Looking next at FIG. 7 of the drawings, the insertion tubes 10G, 10H and 10I have portal structures alternately high and low to produce a biphasic biowall. In the direct line of flow between portal structures, a dense biowall will be created, while outside this region a more diffuse biowall will be formed, which will have a smaller impact on the natural system, but will have a greater zone of influence.

The present invention also contemplates the use of the insertion tubes 10 to monitor the influence of the biowall on such factors as hydraulic conductivity, while being used to monitor the configuration of the biowall within the targeted formation. The monitoring of the formations is illustrated in FIGS. 8 and 9.

One of the early signals in the formation of microbiologic growths, such as biofilm or slimes, within a porous medium is the displacement of void spaces by the biomass. The net effect is a change in hydraulic conductivity, or permeability, through the porous medium. FIG. 8 of the drawings illustrates one method for determining the permeability of the surrounding medium. The injection tube 10J has a portal structure 11J held in place by cables or the like to be located at the site to be examined. An expandable collar 25 will prevent flow within the well casing or the like, and require that the fluid flow will pass through the surrounding medium to be tested. Water, which may contain a specific chemical, or a physical or biological marker, is circulated between the upper and lower portals of the portal structure 11J.

Before constructing a biowall in accordance with the present invention, one should obtain background permeabilities by testing the zones of interest. This can be done by determination of flow rates by conventional methods. Also, the permeabilities can be measured by measuring the flow rate between portal structures of two insertion tubes. With the background permeabilities, the permeability can be measured, and the growth of the biowall is thereby monitored.

An alternative method for monitoring the size and density of a biowall being formed is through the use of a wave-form energy propagated through the porous medium within and above the aquifer. Many different forms of energy may be used, but it is contemplated that sound waves in the infrasonic range will be used.

FIG. 9 of the drawings shows an arrangement wherein an insertion tube 10K has a portal structure 11K towards the lower end. A transducer in the vicinity of the portal structure propagates energy at a frequency and an amplitude suitable to radiate through the formation to the surface. At the surface 28, there is a plurality of detectors 29, or listening posts, to receive the energy propagated through the area. Since the area shown in FIG. 9 has no obstructions, the received energy will be as shown in the graph 30 in FIG. 9, which is a substantially straight line, the diminution being from distance only. This represents the recommended procedure wherein a reading would be made before beginning formation of a biowall so a background profile will be available for the comparison when the readings are taken to determine the extent of the biowall.

FIG. 10 of the drawings is similar to FIG. 9, but shows a biowall 31 formed to the left of the insertion tube 10K. There is also a localized formation 32 close to the surface 28, and closer to the insertion tube 10K. By comparing the data 34 obtained in FIG. 10 with the data 30 in FIG. 9, it will quickly be seen that there is a discrepancy which indicates the localized formation 32. The more remote sensors indicate the presence of the biowall 31.

A less dense form of the biowall 37 is shown in FIG. 11, along with zones of biofouled water 35. This arrangement produces a reduced and spiky signal 36. A complete occlusion of the biowall around the insertion tube 10K would attenuate the signals so that only the sensors closest to the insertion tube would pick up any signals, and no signals would be detected further away. This is shown in FIG. 12 of the drawings.

The dispersal of an established biowall is an important final stage in the operation and management of the system. The dispersal can, in some cases, be achieved by manipulation of the controlling parameters so that the site of biological activity (set by the conjunctive optimization of the various environmental factors to stimulate microbial activity) would be moved, or relocated to a freshly synthesized site. Alternatively, the application of a combination of various physical and chemical factors can be applied to the zone where the biowall is to be removed. The physical and chemical factors may include the application of disinfectants, acidulants and the like which are known to those skilled in the art. The preferred embodiment of the invention includes use of the method and apparatus disclosed in U.S. Pat. No. 4,765,410, issued Aug. 23, 1988, and the entire disclosure of that patent is incorporated herein by this reference.

It should further be noted that it is contemplated in the present invention that recalcitrant chemicals (e.g. noble metals, metal oxides and hydroxides, carbonates, crystalline structures and hazardous organic chemicals) may be recovered from the biowall when the biowall is to be dispersed.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

We claim:

1. A method for providing a temporary barrier in a selected site within a porous formation by clogging said formation by forming a biowall, comprising the steps of adjusting the environment at said selected site to promote the growth of selected microorganisms, said step of adjusting the environment including applying nutrients for said selected microorganisms, and continuing said step of applying nutrients until said temporary barrier is formed.

2. A method as claimed in claim 1, and further including the step of dispersal of said temporary barrier by again adjusting said environment to stop growth of said selected microorganisms.

3. A method as claimed in claim 1, wherein said step of adjusting the environment at said selected site comprises the steps of extending at least one insertion tube into said selected site, and passing said nutrients through said insertion tube to said selected site.

4. A method as claimed in claim 3, wherein said step of extending at least one insertion tube into said selected site comprises the step of extending a plurality of insertion tubes into said selected site, and creating a fluid flow between individual insertion tubes of said plurality of insertion tubes.

5. A method as claimed in claim 3, and including the steps of passing chemicals through said insertion tube for dispersing said barrier subsequent to the step of adjusting the environment.

6. A method for providing a temporary barrier in a selected site within a porous formation, comprising the steps of adjusting the environment at said selected site to promote the growth of microorganisms, said step of adjusting the environment including applying nutrients, injecting additional microorganisms into said selected site, and continuing said step of applying nutrients, and further including the step of dispersal of said temporary barrier by again adjusting said environment to stop growth of microorganisms, said step of adjusting the environment at said selected site comprising the steps of extending at least one insertion tube into said selected site, and passing said nutrients and additional organisms through said insertion tube to said selected site, said step of extending at least one insertion tube into said selected site comprising the step of extending a plurality of insertion tubes into said selected site, and creating a fluid flow between individual insertion tubes of said plurality of insertion tubes, and further including the steps of moving a portal structure along each said insertion tube, directing a first fluid upwardly from said portal structure and directing a second fluid downwardly from said portal structure.

7. A method as claimed in claim 6, and further including the step of propagating a signal from said portal structure prior to said step of adjusting the environment for determination of the existing biomasses at said selected site.

8. A method as claimed in claim 7, and including the step of propagating a signal from said portal structure after said step of adjusting the environment to determine the extent of said temporary barrier.

9. A method for providing a temporary barrier in a selected site within a porous formation by clogging said formation by forming a biowall, comprising the steps of directing a fluid along a path from a first point to a second point, adding nutrients to said fluid for promoting the growth of selected microorganisms along said path, and continuing said step of adding nutrients until said temporary barrier is formed along said path.

10. A method as claimed in claim 9, and further including the step of adding additional organisms to said fluid.

11. A method as claimed in claim 9, wherein said step of directing a fluid along a path comprises the steps of extending at least one insertion tube into said selected site, said fluid being injected through said insertion tube.

* * * * *